US012739808B2

(12) United States Patent
Mu

(10) Patent No.: US 12,739,808 B2
(45) Date of Patent: Sep. 15, 2026

(54) MESSAGE CONFIGURATION METHOD, MESSAGE CONFIGURATION APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 319 days.

(21) Appl. No.: 18/576,947

(22) PCT Filed: Jul. 6, 2021

(86) PCT No.: PCT/CN2021/104817
§ 371 (c)(1), (2) Date: Jan. 5, 2024

(87) PCT Pub. No.: WO2023/279262
PCT Pub. Date: Jan. 12, 2023

(65) Prior Publication Data

US 2024/0323935 A1 Sep. 26, 2024

(51) Int. Cl.
*H04W 72/0453* (2023.01)
*H04L 5/00* (2006.01)

(52) U.S. Cl.
CPC ....... *H04W 72/0453* (2013.01); *H04L 5/0053* (2013.01)

(58) Field of Classification Search
None
See application file for complete search history.

(56) References Cited

U.S. PATENT DOCUMENTS

2014/0248917 A1* 9/2014 Scipione ............... H04L 5/0037 455/509
2019/0215777 A1 7/2019 Kang et al.
(Continued)

FOREIGN PATENT DOCUMENTS

CN 109392173 A 2/2019
CN 110731113 A 1/2020
(Continued)

OTHER PUBLICATIONS

Author Unknown, RAN1 agreements for Rel-17 NR RedCap, Doc. No. R1-2106213, pp. 1-11, May 27, 2021.*
(Continued)

*Primary Examiner* — Christopher M Crutchfield
(74) *Attorney, Agent, or Firm* — Finnegan, Henderson, Farabow, Garrett & Dunner, L.L.P.

(57) ABSTRACT

A message configuration method is performed by a first-type terminal and includes: receiving a first system message, wherein the first system message is used for carrying first transmission configuration information, and the first transmission configuration information includes a portion of configuration information of an initial bandwidth part (BWP) of the first-type terminal; and determining second transmission configuration information not carried in the first system message based on the first system message; wherein the second transmission configuration information is a remaining portion of the configuration information of the initial BWP of the first-type terminal, other than the first transmission configuration information.

20 Claims, 6 Drawing Sheets

(56) References Cited

U.S. PATENT DOCUMENTS

| | | | | |
|---|---|---|---|---|
| 2021/0168810 | A1 | 6/2021 | Chen et al. | |
| 2021/0377933 | A1* | 12/2021 | Takahashi | H04W 28/20 |
| 2022/0287102 | A1* | 9/2022 | Futaki | H04W 74/0833 |
| 2023/0180110 | A1* | 6/2023 | Kim | H04W 48/02 370/329 |
| 2023/0209542 | A1* | 6/2023 | Wang | H04L 5/0053 370/329 |
| 2024/0188122 | A1* | 6/2024 | Desai | H04W 74/006 |

FOREIGN PATENT DOCUMENTS

| | | | | |
|---|---|---|---|---|
| CN | 110831126 A | | 2/2020 | |
| CN | 112075113 A | | 12/2020 | |
| CN | 112312543 A | | 2/2021 | |
| CN | 112889334 A | | 6/2021 | |
| TW | 202014003 A | * | 4/2020 | H04W 72/53 |

OTHER PUBLICATIONS

Author Unknown, Reduced maximum bandwidth for RedCap UEs, Doc. No. R1-2103421, pp. 1-5, May 27, 2021.*

European Patent Office, Extended European Search Report Issued in Application No. 21948760.0, Apr. 3, 2025, 9 pages.

Moderator (Ericsson), "FL summary #3 on reduced maximum UE bandwidth for RedCap", R1-2106001, 3GPP TSG-RAN WG1 Meeting #105-e, e-Meeting, May 19-27, 2021, 73 pages.

Asustek, "Discussion on aspects related to reduced maximum UE bandwidth", R1-2105800, 3GPP TSG RAN WG1 #105-e, e-Meeting, May 10-27, 2021, 5 pages.

Futurewei, "Discussion on Bandwidth Reduction for RedCap UEs", R1-2104188, 3GPP TSG RAN WG1 #105-e, e-Meeting, May 19-27, 2021, 8 pages.

Xiaomi, "Discussion on the access control and configuration for reduced capability device", R1-2008088, 3GPP TSG RAN WG1 #103-e, e-Meeting, Oct. 26-Nov. 13, 2020, 2 pages.

Ericsson, "Reduced maximum UE bandwidth for RedCap", R1-2104179, 3GPP TSG-RAN WG1 Meeting #105-e, e-Meeting, May 19-27, 2021, 29 pages.

ISA State Intellectual Property Office of the People's Republic of China, Written Opinion of the International Searching Authority issued in Application No. PCT/CN2021/104817, Apr. 2, 2022, WIPO, 6 pages.

International Search Report of International Application No. PCT/CN2021/104817, dated Apr. 2, 2022, 3 pages.

Vivo, Guangdong Genius, "Discussion on complexity reduction for Reduced Capability NR devices", 3GPP TSG RAN WG1 #102-e, R1-2005383, e-Meeting, Aug. 17-28, 2020, 9 pages.

Vivo, "Clarification on initial BWP in SIB1", 3GPP TSG-RAN WG2 Meeting #103bis, R2-1813755, Chengdu, China, Oct. 8-12, 2018, 4 pages.

LG Electronics Inc., "Support and control of initial cell access for reduced capability NR devices", 3GPP TSG RAN WG1 Meeting #102-e, R1-2006310, Online, Aug. 17-28, 2020,4 pages.

* cited by examiner

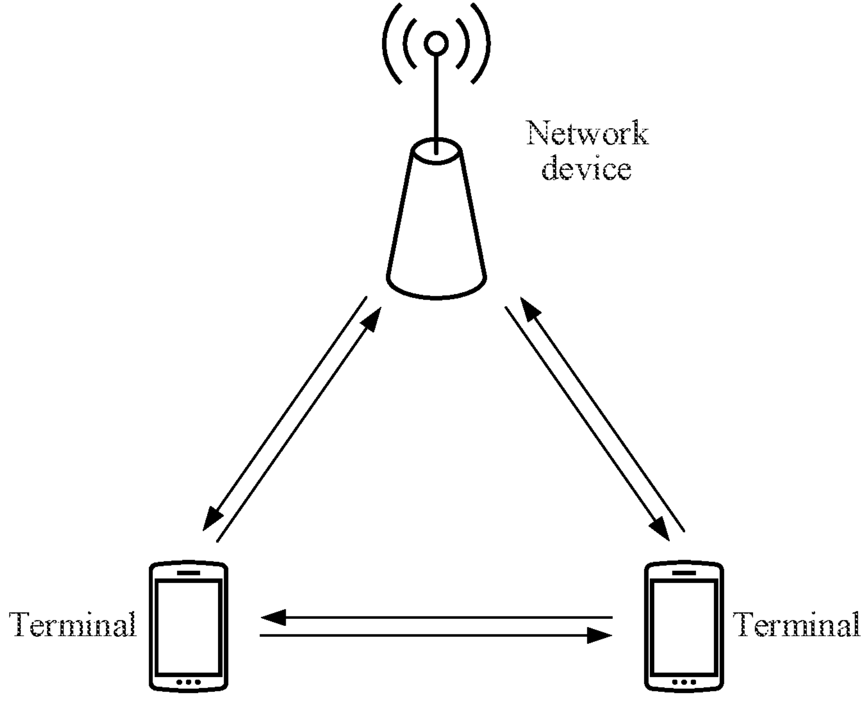
FIG. 1
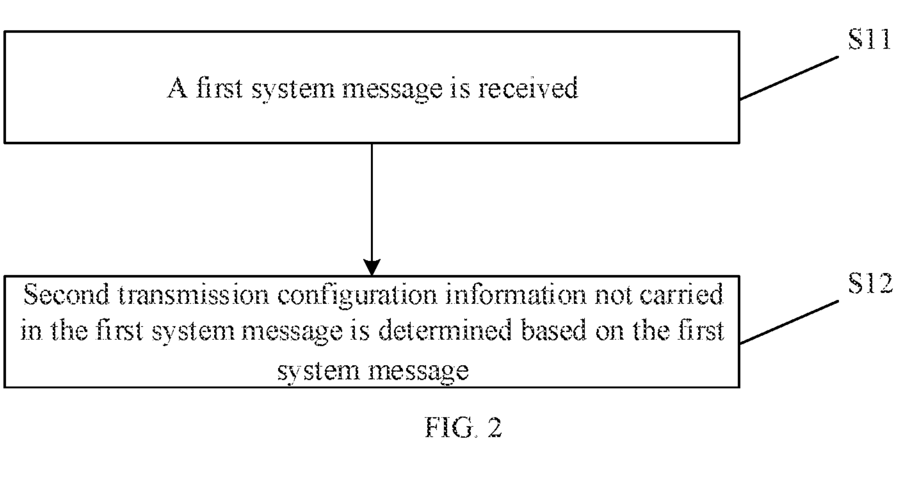
FIG. 2
The second transmission configuration information not carried in the first system message is determined based on the first transmission configuration information
S21
FIG. 3

The first transmission configuration information including a portion of configuration information of an uplink BWP of a second-type terminal is determined, and the portion of the configuration information of the uplink BWP of the second-type terminal is determined as the second transmission configuration information

The first transmission configuration information including a portion of configuration information of a downlink BWP of a second-type terminal is determined, and the portion of the configuration information of the downlink BWP of the second-type terminal is determined as the second transmission configuration information

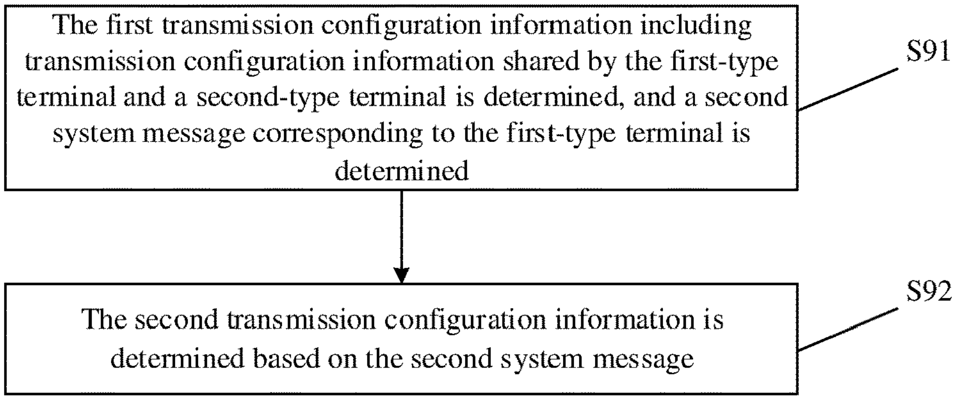

FIG. 10

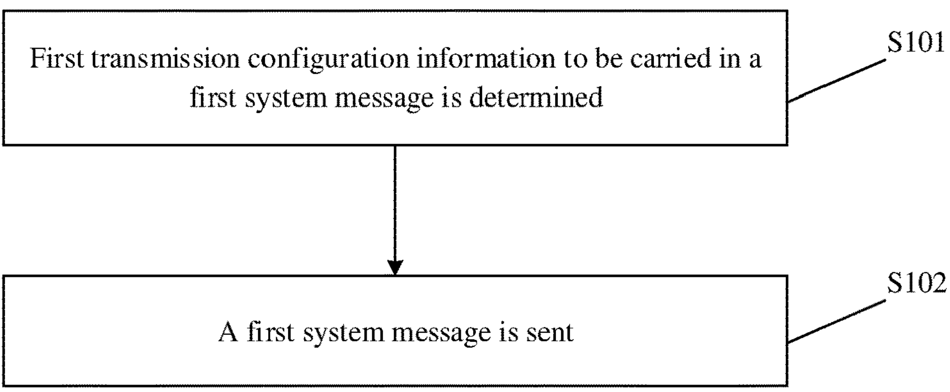

FIG. 11

MESSAGE CONFIGURATION METHOD, MESSAGE CONFIGURATION APPARATUS, AND STORAGE MEDIUM

CROSS-REFERENCE TO RELATED APPLICATIONS

The present disclosure is a U.S. national phase of PCT Application No. PCT/CN2021/104817 filed on Jul. 6, 2021, the content of which is hereby incorporated by reference in its entirety.

TECHNICAL FIELD

The present disclosure relates to a field of a wireless communication technology, and particularly to a message configuration method, a message configuration apparatus, and a storage medium.

BACKGROUND

In a new generation of communication technology, reduced capability (Redcap) terminals are introduced. Due to bandwidth limitations, a specific initial bandwidth part (BWP) is to be configured for the Redcap terminals. That is, in addition to an existing initial BWP, an additional initial BWP is to be configured for the Redcap terminals, and channel information for transmission is to be configured in the additional initial BWP.

SUMMARY

The present disclosure provides a message configuration method, a message configuration apparatus, and a storage medium.

According to a first aspect of embodiments of the present disclosure, a message configuration method is provided. The message configuration method is performed by a first-type terminal, and includes:

receiving a first system message, where the first system message is configured for carrying first transmission configuration information, and the first transmission configuration information includes a portion of configuration information of an initial bandwidth part (BWP) of the first-type terminal; and determining second transmission configuration information not carried in the first system message based on the first system message; where the second transmission configuration information is a remaining portion of the configuration information of the initial BWP of the first-type terminal, other than the first transmission configuration information.

According to a second aspect of embodiments of the present disclosure, a message configuration method is provided. The message configuration method is performed by a network device, and includes:

determining first transmission configuration information to be carried in a first system message: where the first transmission configuration information includes a portion of configuration information of an initial bandwidth part (BWP) of the first-type terminal; and sending the first system message; where the first system message is configured for the first-type terminal to determine second transmission configuration information not carried in the first system message; where the second transmission configuration information is a remaining portion of the configuration information of the initial BWP of the first-type terminal, other than the first transmission configuration information.

According to a third aspect of embodiments of the present disclosure, a message configuration apparatus is provided. The message configuration apparatus includes:

a processor and a memory storing instructions executable by the processor; where, the processor is configured for: performing the message configuration method described in the first aspect or any one of the implementations of the first aspect, or performing the message configuration method described in the second aspect or any one of the implementations of the second aspect.

It should be understood that the above general description and the detailed description in the following text are only exemplary and explanatory, and cannot limit the present disclosure.

BRIEF DESCRIPTION OF DRAWINGS

The accompanying drawings here are incorporated into the specification and form a part of this specification, show embodiments conforming to the present disclosure, and are used together with the specification to explain principles of the present disclosure.

FIG. 1 is an architecture diagram of a communication system including a network device and terminals shown according to an exemplary embodiment.

FIG. 2 is a flowchart of a message configuration method shown according to an exemplary embodiment.

FIG. 3 is a flowchart of a message configuration method shown according to an exemplary embodiment.

FIG. 4 is a flowchart of a message configuration method shown according to an exemplary embodiment.

FIG. 5 is a flowchart of a message configuration method shown according to an exemplary embodiment.

FIG. 6 is a flowchart of a message configuration method shown according to an exemplary embodiment.

FIG. 7 is a flowchart of a message configuration method shown according to an exemplary embodiment.

FIG. 8 is a flowchart of a message configuration method shown according to an exemplary embodiment.

FIG. 9 is a flowchart of a message configuration method shown according to an exemplary embodiment.

FIG. 10 is a flowchart of a message configuration method shown according to an exemplary embodiment.

FIG. 11 is a flowchart of a message configuration method shown according to an exemplary embodiment.

DETAILED DESCRIPTION

Figure 12:
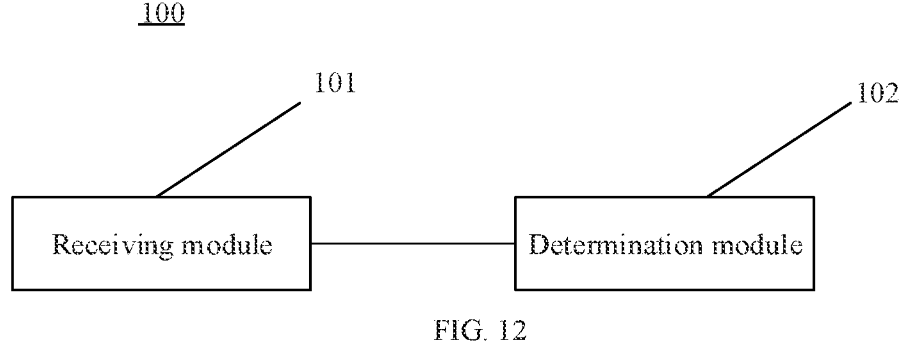
FIG. 12 is a block diagram of a message configuration apparatus shown according to an exemplary embodiment.

Exemplary embodiments will be explained in detail herein, and examples thereof are illustrated in accompanying drawings. When the following description refers to the accompanying drawings, unless otherwise indicated, same numbers in different figures represent same or similar elements. Implementations described in the following exemplary embodiments do not represent all implementations consistent with the present disclosure. On the contrary, they are only examples of apparatuses and methods that are consistent with some aspects of the present disclosure as detailed in the attached claims.

In related technologies, all the channel information for transmission configured in the additional initial BWP is configured in a system message SIB1. However, due to a limited capacity of the SIB1, all the channel information for transmission configured is configured in the SIB1, which may lead to insufficiency of the capacity of the SIB1.

FIG. 1 is an architecture diagram of a communication system including a network device and terminals shown according to an exemplary embodiment. A communication method provided by the present disclosure may be performed by the architecture diagram of the communication system shown in FIG. 1. As shown in FIG. 1, the network device may send a signal based on the architecture shown in FIG. 1.

It should be understood that the communication system including the network device and the terminals shown in FIG. 1 is only for schematic explanation. The wireless communication system may also include other network devices, such as core network devices, wireless relay devices, wireless backhaul devices, etc., which are not shown in FIG. 1. The embodiments of the present disclosure do not limit the number of network devices and the number of terminals included in the wireless communication system.

It can be further understood that the wireless communication system of the embodiments of the present disclosure constitutes a network that provides a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance. According to factors of different networks, such as a capacity, a rate, a latency, etc., the networks may be categorized into a 2G (generation) network, a 3G network, a 4G network, or a future evolution network, such as a 5G network that is also referred to as a new radio (NR) network. For the convenience of description, the wireless communication network is sometimes referred to as a network in the present disclosure.

Moreover, the network devices involved in the present disclosure may also be referred to as wireless access network devices. The wireless access network devices may be: base stations, evolved base stations (evolved node Bs), home base stations, access points (APs) in a wireless fidelity (WIFI) system, wireless relay nodes, wireless backhaul nodes, transmission points (TPs), or transmission and reception points (TRPs), etc. The wireless access network devices also may be: gNBs in a NR system, or components or part of the devices constituting the base stations, etc. When the network is a Vehicle-to-Everything (V2X) communication system, the network devices may also be vehicle-mounted devices. It should be understood that specific technologies and specific device forms adopted by the network devices are not limited in the embodiments of the present disclosure.

Moreover, the terminals involved in the present disclosure are also referred to as terminal devices, user equipment (UE), mobile stations (MSs), mobile terminals (MTs), etc., and are devices that provide voice and/or data connectivity to users. For example, the terminals may be handheld devices, vehicle-mounted devices, etc., that have a wireless connection function. At present, examples of some terminals are smartphones (mobile phones), pocket personal computers (PPCs), handheld computers, personal digital assistants (PDAs), laptops, tablets, wearable devices, or vehicle-mounted devices, etc. Additionally, when the network is the Vehicle-to-Everything (V2X) communication system, the terminal devices may also be the vehicle-mounted devices. It should be understood that specific technologies and specific device forms adopted by the terminals are not limited in the embodiments of the present disclosure.

It should be understood that although terms, such as "first," "second," "third," etc., may be used in the embodiments of the present disclosure to describe various information, such information should not be limited by these terms. These terms are only used to distinguish the same type of information from each other. For example, without departing from the scope of the embodiments of the present disclosure, first information may also be referred to as second information, and similarly, the second information may also be referred to as the first information. Depending on the context, the term "if" used herein may be interpreted as "when." "while," or "in response to determining."

Rapid development of Internet of Things (IoT) has brought many conveniences to human life and work. A machine type communication (MTC) technology and a narrow band Internet of Things (NB-IoT) technology are typical representatives of a cellular Internet of Things technology. At present, these technologies have been widely used in various fields, such as smart city (e.g., meter reading), smart agriculture (e.g., collection of information, such as temperature and humidity), and smart transportation (e.g., shared bicycles), etc.

In the communication system, for scenarios in Internet of Things services, such as low rate and high latency scenarios (for example, the meter reading, environmental monitoring, etc.), the MTC and NB-IoT technologies are proposed in the related technologies. At present, the NB-IoT technology may support a maximum rate of several hundred Kbps, and the MTC technology may support a maximum rate of several Mbps. However, with continuous development of the Internet of Things services (such as monitoring, smart homes, wearable devices, industrial sensor detection, etc.), these services generally require a rate of tens to one hundred Mbps, and have relatively high latency requirements. Thus, in the communication system, the MTC and NB-IoT technologies are no longer able to meet current requirements of the Internet of Things service. On the other hand, the MTC and NB-IoT technologies are generally deployed in scenarios where it is difficult to charge or replace batteries, such as basements, fields. Therefore, terminals associated with the MTC and NB-IoT technologies are hardware limited, resulting in weaker coverage capabilities compared to general wireless communication terminals. Moreover, due to influences of application environments, power savings of devices for the MTC and NB-IoT technologies also have characteristics of the MTC and NB-IoT technologies. Based on this situation, a new type of user equipment is proposed in the 5G NR to cover requirements of such Internet of Things devices. In a current 3GPP (3rd generation partnership project) standardization, this new terminal type is called as a Redcap terminal or simply a NR-lite (new radio for short).

In the related technologies, when a terminal is to access a certain cell, the terminal is firstly to acquire a synchronization signal block (SSB) that includes a primary synchronization signal (PSS), a secondary synchronization signal (SSS), and a physical broadcast channel (PBCH). By reading configuration in the physical broadcast channel, the terminal obtains configuration information of a control resource set (CORESET) #0. The CORESET #0 includes information such as a frequency domain position, a frequency domain bandwidth, etc. Resources in the CORESET #0 also include a physical downlink control channel (PDCCH) that may schedule remaining Minimum system information (RMSI). The PDCCH indicates scheduling information, including the RMSI, of the physical downlink shared channel (PDSCH). The terminal determines the initial BWP by reading the RMSI.

The manner for the terminal to determine the initial BWP by reading the RMSI is as follows.

An implementation for an initial downlink BWP is that: in a random access process, a frequency domain position of the initial downlink BWP is the frequency domain position of the CORESET #0; after the random access, if there is configuration information of the initial downlink BWP in the RMSI, the terminal determines a frequency domain position of the initial downlink BWP based on the configuration information; and if there is no configuration information of the initial downlink BWP in the RMSI, the frequency domain position where the CORESET #0 is located is determined as the frequency domain position of the initial downlink BWP of the terminal.

An implementation for an initial uplink BWP is that: a frequency domain position of the initial uplink BWP of the terminal is determined based on the configuration information in the RMSI.

It should be noted that the initial downlink BWP includes transmission configuration parameters of channels, such as the PDCCH, the PDSCH, etc. Therefore, the initial downlink BWP also includes transmission configuration information related to the PDCCH, the PDSCH, etc., for example, configuration information such as the CORESET, configuration a resource allocation method, etc. The initial uplink BWP includes transmission configuration information of channels, such as a physical random access channel (PRACH), a physical uplink shared channel (PUSCH), a physical uplink control channel (PUCCH), etc. Therefore, the configuration of the initial uplink BWP also includes related configuration information of these channels.

However, in a RedCap terminal, due to bandwidth limitations of the RedCap terminal, it is to configure a special initial downlink BWP and/or initial uplink BWP for the RedCap terminal. That is, in addition to an existing initial downlink BWP and initial uplink BWP, an additional initial downlink BWP and initial uplink BWP are to be configured. At the same time, it is also to further configure the channel information transmitted in these BWPs. For example, the initial downlink BWP includes transmission configuration information related to the SSB, a common CORESET, the PDSCH, etc.; and the initial uplink BWP includes transmission configuration information related to the PRACH, the PUSCH, the PUCCH, etc.

In the related technologies, all the transmission configuration information of the initial BWPs (such as the initial downlink BWP and the initial uplink BWP) is to be configured in a system message 1 (SIB1). However, the capacity of the SIB1 is limited and is about 2200 bits. If all the transmission configuration information of the initial BWPs is configured in the SIB1 for transmission, there may be a problem of insufficient capacity of the SIB1. Based on this, the present disclosure provides a message configuration method. In the method, a portion of configuration information of the initial BWP of the RedCap terminal is configured in the SIB1, and the remaining portion of the configuration information of the BWP is determined based on a predefined rule, to avoid the problem of the insufficient capacity of the SIB1.

FIG. 2 is a flowchart of a message configuration method shown according to an exemplary embodiment. As shown in FIG. 2, the message configuration method is performed by a first-type terminal and includes the following steps.

In a step S11, a first system message is received.

The first system message is configured for carrying first transmission configuration information. The first transmission configuration information includes a portion of configuration information of an initial bandwidth part (BWP) of the first-type terminal.

In the embodiments of the present disclosure, the first-type terminal may be a RedCap terminal, and of course, may also be another type of terminal. The first system message may be the SIB1, and of course, may also be another system message, which is not specifically limited in the present disclosure.

In a step S12, second transmission configuration information not carried in the first system message is determined based on the first system message.

The second transmission configuration information is a remaining portion of the configuration information of the initial BWP of the first-type terminal, other than the first transmission configuration information.

Technical solutions provided by the embodiments of the present disclosure may include the following beneficial effects: through the present disclosure, a portion of configuration information of the BWP of the first-type terminal is configured in the first system message, the first-type terminal may determine the unconfigured second transmission configuration information based on the predefined rule or protocol stipulation, which may reduce the configuration information carried in the first system message and avoid the problem of the insufficient capacity of the first system message.

In the embodiments of the present disclosure, the first-type terminal receives the first system message sent by the network and determines a portion of the configuration information of the BWP carried in the first system message, and then the first-type terminal may determine a remaining portion of the configuration information of the BWP, not carried in the first system message and other than the first transmission configuration information, based on a predefined rule or protocol stipulation. For ease of description in the present disclosure, the portion of the configuration information of the BWP carried in the first system message is referred to as the first transmission configuration information; and a remaining portion of the configuration information of the BWP, not carried in the first system message and other than the first transmission configuration information, is referred to as the second transmission configuration information.

By the message configuration method provided by the embodiments of the present disclosure, a portion of the configuration information of the BWP may be configured in the first system message, and a remaining portion of the configuration information of the BWP, not carried in the first system message and other than the first transmission configuration information, may be determined based on the predefined rule or protocol stipulation, which reduces the configuration information carried in the first system message and avoids the problem of the insufficient capacity of the first system message.

In some embodiments of the present disclosure, the configuration information of the BWP at least includes any one of:

frequency band information of a BWP;

configuration information of one or more channels within a BWP; and subcarrier spacing information of a BWP.

FIG. 3 is a flowchart of a message configuration method shown according to an exemplary embodiment. As shown in FIG. 3, the message configuration method is performed by the first-type terminal and includes the following step.

In a step S21, the second transmission configuration information not carried in the first system message is determined based on the first transmission configuration information.

In the embodiments of the present disclosure, the terminal may determine the second transmission configuration information not carried in the first system message, based on the first transmission configuration information carried in the first system message and the predefined rule or protocol stipulation.

In some embodiments of the present disclosure, the predefined rule or protocol stipulation may be the frequency domain position in the first transmission configuration information being the same as the frequency domain position in the second transmission configuration information.

Figures 4, 5, 6, 7:
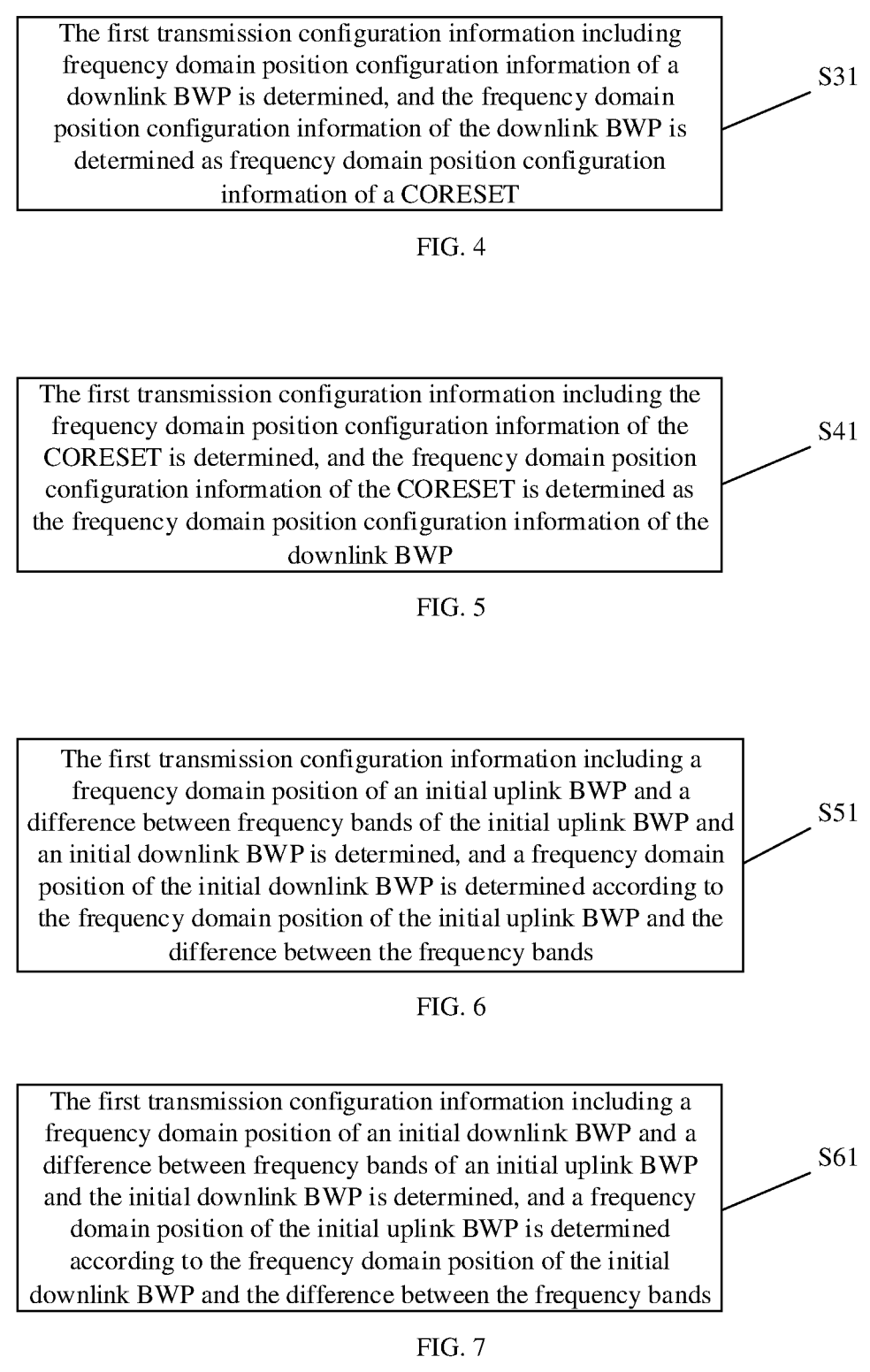

FIG. 4 is a flowchart of a message configuration method shown according to an exemplary embodiment. As shown in FIG. 4, the message configuration method is performed by the first-type terminal and includes the following step.

In a step S31, the first transmission configuration information including frequency domain position configuration information of a downlink BWP is determined, and the frequency domain position configuration information of the downlink BWP is determined as frequency domain position configuration information of a CORESET.

The frequency domain position configuration information of the CORESET is the second transmission configuration information.

In the embodiments of the present disclosure, the network device configuring the frequency domain position of the initial downlink BWP in the first system message is determined, and based on the predefined rule or protocol stipulation that the frequency domain position in the first transmission configuration information is same as the frequency domain position in the second transmission configuration information, the frequency domain position of the initial downlink BWP is determined as the frequency domain position of the common CORESET.

FIG. 5 is a flowchart of a message configuration method shown according to an exemplary embodiment. As shown in FIG. 5, the message configuration method is performed by the first-type terminal and includes the following step.

In a step S41, the first transmission configuration information including the frequency domain position configuration information of the CORESET is determined, and the frequency domain position configuration information of the CORESET is determined as the frequency domain position configuration information of the downlink BWP.

The frequency domain position configuration information of the downlink BWP is the second transmission configuration information.

In the embodiments of the present disclosure, the network device configuring the frequency domain position of the common CORESET in the first system message is determined, and based on the predefined rule or protocol stipulation that the frequency domain position in the first transmission configuration information is same as the frequency domain position in the second transmission configuration information, the frequency domain position of the common CORESET is determined as the frequency domain position of the downlink BWP.

FIG. 6 is a flowchart of a message configuration method shown according to an exemplary embodiment. As shown in FIG. 6, the message configuration method is performed by the first-type terminal and includes the following step.

In a step S51, the first transmission configuration information including a frequency domain position of an initial uplink BWP and a difference between frequency bands of the initial uplink BWP and an initial downlink BWP is determined, and a frequency domain position of the initial downlink BWP is determined according to the frequency domain position of the initial uplink BWP and the difference between the frequency bands.

The frequency domain position of the initial downlink BWP is the second transmission configuration information.

In some embodiments of the present disclosure, in a time division duplexing (TDD) system, the initial uplink BWP and the initial downlink BWP of the first-type terminal have a same center frequency point. The network device configuring the frequency domain position of the initial uplink BWP and the difference between the frequency bands of the initial uplink BWP and the initial downlink BWP in the first system message is determined, based on the predefined rule or protocol stipulation, a value is obtained by calculation on the frequency domain position of the initial uplink BWP and the difference between the frequency bands, and the frequency domain position of the initial downlink BWP is determined according to the value obtained by the calculation, so that the second transmission configuration information is determined.

FIG. 7 is a flowchart of a message configuration method shown according to an exemplary embodiment. As shown in FIG. 7, the message configuration method is performed by the first-type terminal and includes the following step.

In a step S61, the first transmission configuration information including a frequency domain position of an initial downlink BWP and a difference between frequency bands of an initial uplink BWP and the initial downlink BWP is determined, and a frequency domain position of the initial uplink BWP is determined according to the frequency domain position of the initial downlink BWP and the difference between the frequency bands.

The frequency domain position of the initial uplink BWP is the second transmission configuration information.

In some embodiments of the present disclosure, in the TDD system, the initial uplink BWP and the initial downlink BWP of the first-type terminal have the same center frequency point. The network device configuring the frequency domain position of the initial downlink BWP and the difference between the frequency bands of the initial uplink BWP and the initial downlink BWP in the first system message is determined, based on the predefined rule or protocol stipulation, a value is obtained by calculation on the frequency domain position of the initial downlink BWP and the difference between the frequency bands, and the frequency domain position of the initial uplink BWP is determined according to the value obtained by the calculation, so that the second transmission configuration information is determined.

In some embodiments of the present disclosure, the predefined rule or protocol stipulation may be the configuration information of the first-type terminal being same as configuration information of a second-type terminal.

FIG. 8 is a flowchart of a message configuration method shown according to an exemplary embodiment. As shown in FIG. 8, the message configuration method is performed by the first-type terminal and includes the following step.

In a step S71, the first transmission configuration information including a portion of configuration information of an uplink BWP of a second-type terminal is determined, and the portion of the configuration information of the uplink BWP of the second-type terminal is determined as the second transmission configuration information.

A capability of the second-type terminal is greater than a capability of the first-type terminal.

In the embodiments of the present disclosure, the network device may configure a portion of the configuration information of the uplink BWP of the second-type terminal in the first system message, based on the predefined rule or protocol stipulation that the configuration information of the first-type terminal is same as the configuration information of the second-type terminal, the portion of the configuration information of the uplink BWP of the second-type terminal is determined as the second transmission configuration information, that is, the configuration information of the uplink BWP of the first-type terminal is determined.

FIG. 9 is a flowchart of a message configuration method shown according to an exemplary embodiment. As shown in FIG. 9, the message configuration method is performed by the first-type terminal and includes the following step.

In a step S81, the first transmission configuration information including a portion of configuration information of a downlink BWP of a second-type terminal is determined, and the portion of the configuration information of the downlink BWP of the second-type terminal is determined as the second transmission configuration information.

A capability of the second-type terminal is greater than a capability of the first-type terminal.

In the embodiments of the present disclosure, the network device may configure a portion of the configuration information of the downlink BWP of the second-type terminal in the first system message, based on the predefined rule or protocol stipulation that the configuration information of the first-type terminal is same as the configuration information of the second-type terminal, the portion of the configuration information of the downlink BWP of the second-type terminal is determined as the second transmission configuration information, that is, the configuration information of the downlink BWP of the first-type terminal is determined.

In some embodiments of the present disclosure, the predefined rule or protocol stipulation may be determining the second transmission configuration information based on other broadcast message configuration information for the first-type terminal. The other broadcast message configuration information for the first-type terminal may be an SSB for the first-type terminal, or an SIB for the first-type terminal, etc.

FIG. 10 is a flowchart of a message configuration method shown according to an exemplary embodiment. As shown in FIG. 10, the message configuration method is performed by the first-type terminal and includes the following steps.

In a step S91, the first transmission configuration information including transmission configuration information shared by the first-type terminal and a second-type terminal is determined, and a second system message corresponding to the first-type terminal is determined.

In a step S92, the second transmission configuration information is determined based on the second system message.

In the embodiments of the present disclosure, the second system message is a system message for the first-type terminal. For example, the second system message for the first-type terminal may be an SSB for the first-type terminal, or an SIB for the first-type terminal, etc.

The network device configures the transmission configuration information shared by the first-type terminal and a second-type terminal in the first system message, that is, the first system message includes a portion of transmission configuration information of the first-type terminal. After the first-type terminal receives the first system message, according to the predefined rule or protocol stipulation that the second transmission configuration information is determined based on the other broadcast message configuration information for the first-type terminal, the first-type terminal determines to receive the second system message, so that the second transmission configuration information not carried in the first system message can be determined.

For example, the configuration information of the SSB may be carried in the first system message (such as SIB1). The SIB1 may include a period of an SSB burst, the number of SSBs included in the SSB burst, or a time-frequency position of the SSB that the first-type terminal is to monitor and/or relationship between the first-type terminal and a channel state (Quasi Co-Location, QSL). An MIB (master information block) within the SSB specific to the first-type terminal includes subsequent configuration relationships for the common CORESET specific to the first-type terminal. A time-frequency multiplexing relationship may be predefined between the SSB specific to the first-type terminal and the common CORESET specific to the first-type terminal. The common CORESET specific to the first-type terminal may schedule the SIB specific to the first-type terminal, and the SIB specific to the first-type terminal may include the initial downlink BWP, the initial uplink BWP, and respective channel configuration information.

For example, the first system message (e.g., SIB1) may include CORESET information of the first-type terminal, and the frequency domain position of the CORESET is the position of the initial downlink BWP of the first-type terminal. The downlink control information (DCI) in the CORESET may schedule the PDSCH in the initial downlink BWP, and the SIB, in the PDSCH, for the first-type terminal may include information about the initial uplink BWP, SSB PDCCH, PDSCH SSB, and other configurations of the first-type terminal.

Based on the same/similar concept, embodiments of the disclosure also provide a message configuration method.

FIG. 11 is a flowchart of a message configuration method shown according to an exemplary embodiment. As shown in FIG. 11, the message configuration method is performed by a network device and includes the following steps.

In a step S101, first transmission configuration information to be carried in a first system message is determined.

The first transmission configuration information includes a portion of configuration information of an initial bandwidth part (BWP) of the first-type terminal.

In a step S102, a first system message is sent.

The first system message is configured for the first-type terminal to determine second transmission configuration information not carried in the first system message. The second transmission configuration information is a remaining portion of the configuration information of the initial BWP of the first-type terminal, other than the first transmission configuration information.

In the embodiments of the present disclosure, the network device determines the first transmission configuration information carried in the first system message and sends the first system message.

By the message configuration method provided by the embodiments of the present disclosure, a portion of the configuration information of the BWP may be configured in the first system message, and a remaining portion of the configuration information of the BWP, not carried in the first system message and other than the first transmission configuration information, may be determined based on the predefined rule or protocol stipulation, which reduces the configuration information carried in the first system message and avoids the problem of the insufficient capacity of the first system message.

In some embodiments of the present disclosure, the configuration information of the BWP at least includes any one of:

frequency band information of a BWP;

configuration information of one or more channels within a BWP; and subcarrier spacing information of a BWP.

In some embodiments of the present disclosure, the predefined rule or protocol stipulation may be the frequency domain position in the first transmission configuration information being the same as the frequency domain position in the second transmission configuration information.

In some embodiments of the present disclosure, the first transmission configuration information includes first frequency domain position configuration information.

For example, the network device may configure the frequency domain position of the initial downlink BWP in the first system message, based on the predefined rule or protocol stipulation that the frequency domain position in the first transmission configuration information is same as the frequency domain position in the second transmission configuration information, the first-type terminal determines the frequency domain position of the initial downlink BWP as the frequency domain position of the common CORESET. The network device configuring the frequency domain position of the common CORESET in the first system message is determined, and based on the predefined rule or protocol stipulation that the frequency domain position in the first transmission configuration information is same as the frequency domain position in the second transmission configuration information, the frequency domain position of the common CORESET is determined as the frequency domain position of the initial downlink BWP.

In some embodiments of the present disclosure, the first transmission configuration information includes the frequency domain position of the uplink BWP and the difference between frequency bands of the uplink BWP and the downlink BWP.

For example, in the TDD system, the initial uplink BWP and the initial downlink BWP of the first-type terminal have the same center frequency point. The network device may configure the frequency domain position of the initial uplink BWP and the difference between the frequency bands of the initial uplink BWP and the initial downlink BWP in the first system message, based on the predefined rule or protocol stipulation, the first-type terminal obtains a value by calculation on the frequency domain position of the initial uplink BWP and the difference between the frequency bands, and determines the frequency domain position of the initial downlink BWP according to the value obtained by the calculation, so that the second transmission configuration information is determined.

In some embodiments of the present disclosure, the first transmission configuration information includes the frequency domain position of the downlink BWP and the difference between frequency bands of the uplink BWP and the downlink BWP.

For example, in the TDD system, the initial uplink BWP and the initial downlink BWP of the first-type terminal have the same center frequency point. The network device may configure the frequency domain position of the initial downlink BWP and the difference between frequency bands of the initial uplink BWP and the initial downlink BWP in the first system message. Based on the predefined rule or protocol stipulation, the first-type terminal obtains a value by calculation on the frequency domain position of the initial downlink BWP and the difference between the frequency bands, and determines the frequency domain position of the initial uplink BWP according to the value obtained by the calculation, so that the second transmission configuration information is determined.

In some embodiments of the present disclosure, the predefined rule or protocol stipulation may be the configuration information of the first-type terminal being same as the configuration information of the second-type terminal. A capability of the second-type terminal is greater than a capability of the first-type terminal.

In some embodiments of the present disclosure, the first transmission configuration information includes configuration information of an uplink BWP of a second-type terminal.

For example, in the embodiments of the present disclosure, the network device may configure a portion of the configuration information of the uplink BWP of the second-type terminal in the first system message, and based on the predefined rule or protocol stipulation that the configuration information of the first-type terminal is same as the configuration information of the second-type terminal, the portion of the configuration information of the uplink BWP of the second-type terminal is determined as the second transmission configuration information, that is, the configuration information of the uplink BWP of the first-type terminal is determined.

In some embodiments of the present disclosure, the first transmission configuration information includes configuration information of a downlink BWP of a second-type terminal.

For example, the network device may configure a portion of configuration information of the downlink BWP of the second-type terminal in the first system message, based on the predefined rule or protocol stipulation that the configuration information of the first-type terminal is same as the configuration information of the second-type terminal, the portion of the configuration information of the downlink BWP of the second-type terminal is determined as the second transmission configuration information, that is, the configuration information of the downlink BWP of the first-type terminal is determined.

In some embodiments of the present disclosure, the predefined rule or protocol stipulation may be determining the second transmission configuration information based on other broadcast message configuration information for the first-type terminal. The other broadcast message configuration information for the first-type terminal may be the SSB for the first-type terminal, or the SIB for the first-type terminal, etc.

In some embodiments of the present disclosure, the first transmission configuration information includes transmission configuration information shared by the first-type terminal and a second-type terminal.

The network device configures the transmission configuration information shared by the first-type terminal and a second-type terminal in the first system message, that is, the first system message includes a portion of transmission configuration information of the first-type terminal. After the first-type terminal receives the first system message, according to the predefined rule or protocol stipulation that the second transmission configuration information is determined based on the other broadcast message configuration information for the first-type terminal, the first-type terminal determines to receive the second system message, so that the second transmission configuration information not carried in the first system message can be determined.

For example, the configuration information of the SSB may be carried in the first system message (such as SIB1). The SIB1 may include a period of an SSB burst, the number of SSBs included in the SSB burst, or a time-frequency position of the SSB that the first-type terminal is to monitor and/or relationship between the first-type terminal and a channel state (Quasi Co-Location, QSL). An MIB (master information block) within the SSB specific to the first-type terminal includes subsequent configuration relationships for the common CORESET specific to the first-type terminal. A time-frequency multiplexing relationship may be predefined between the SSB specific to the first-type terminal and the common CORESET specific to the first-type terminal. The common CORESET specific to the first-type terminal may schedule the SIB specific to the first-type terminal, and the SIB specific to the first-type terminal may include the initial downlink BWP, the initial uplink BWP, and respective channel configuration information.

For example, the first system message (e.g., SIB1) may include CORESET information of the first-type terminal, and the frequency domain position of the CORESET is the position of the initial downlink BWP of the first-type terminal. The downlink control information (DCI) in the CORESET may schedule the PDSCH in the initial downlink BWP, and the SIB, in the PDSCH, of the first-type terminal may include information about the initial uplink BWP, SSB PDCCH, PDSCH SSB, and other configurations of the first-type terminal.

Based on the same concept, embodiments of the disclosure also provide a message configuration apparatus.

It can be understood that the message configuration apparatus provided by the embodiments of the disclosure, to achieve the above functions, includes corresponding hardware structures and/or software modules to execute various functions. Combined with units and algorithm steps of various examples disclosed in the embodiments of the present disclosure, the embodiments of the present disclosure can be implemented in hardware or a combination of the hardware and computer software. Whether a certain function is performed in the hardware or the computer software driving the hardware depends on specific applications and design constraint conditions of technical solutions. Those skilled in the art may use different methods to implement the described functions for each specific application, but such implementation should not be considered to be beyond the scope of the technical solutions of the embodiments of the present disclosure.

FIG. 12 is a block diagram of a message configuration apparatus shown according to an exemplary embodiment. Referring to FIG. 12, the message configuration apparatus 100 is applied to a first-type terminal, and includes a receiving module 101 and a determination module 102.

The receiving module 101 is configured for receiving a first system message, where the first system message is configured for carrying first transmission configuration information, and the first transmission configuration information includes a portion of configuration information of an initial bandwidth part (BWP) of the first-type terminal. The determination module 102 is configured for determining second transmission configuration information not carried in the first system message based on the first system message. The second transmission configuration information is a remaining portion of the configuration information of the initial BWP of the first-type terminal, other than the first transmission configuration information.

In the embodiments of the present disclosure, the configuration information of the BWP at least includes any one of:

frequency band information of a BWP; configuration information of one or more channels within a BWP; and subcarrier spacing information of a BWP.

In the embodiments of the present disclosure, the determination module 102 is configured for determining the second transmission configuration information not carried in the first system message based on the first transmission configuration information.

In the embodiments of the present disclosure, the determination module 102 is configured for, determining the first transmission configuration information including frequency domain position configuration information of a downlink BWP, and determining the frequency domain position configuration information of the downlink BWP as frequency domain position configuration information of a physical resource CORESET, where the frequency domain position configuration information of the CORESET is the second transmission configuration information; or determining the first transmission configuration information including the frequency domain position configuration information of the CORESET, and determining the frequency domain position configuration information of the CORESET as the frequency domain position configuration information of the downlink BWP, where the frequency domain position configuration information of the downlink BWP is the second transmission configuration information.

In the embodiments of the present disclosure, the determination module 102 is configured for, determining the first transmission configuration information including a frequency domain position of an initial uplink BWP and a difference between frequency bands of the initial uplink BWP and an initial downlink BWP, and determining a frequency domain position of the initial downlink BWP according to the frequency domain position of the initial uplink BWP and the difference between the frequency bands. The frequency domain position of the initial downlink BWP is the second transmission configuration information.

In the embodiments of the present disclosure, the determination module 102 is configured for, determining the first transmission configuration information including a frequency domain position of an initial downlink BWP and a difference between frequency bands of the initial uplink BWP and an initial downlink BWP, and determining a frequency domain position of the initial uplink BWP according to the frequency domain position of the initial downlink BWP and the difference between the frequency bands. The frequency domain position of the initial uplink BWP is the second transmission configuration information.

In the embodiments of the present disclosure, the determination module 102 is configured for, determining the first transmission configuration information including a portion of configuration information of an uplink BWP of a second-type terminal, and determining the portion of the configuration information of the uplink BWP of the second-type terminal as the second transmission configuration information. A capability of the second-type terminal is greater than a capability of the first-type terminal.

In the embodiments of the present disclosure, the determination module 102 is configured for, determining the first transmission configuration information including a portion of configuration information of a downlink BWP of a second-type terminal, and determining the portion of the configuration information of the downlink BWP of the second-type terminal as the second transmission configuration information. A capability of the second-type terminal is greater than a capability of the first-type terminal.

In the embodiments of the present disclosure, the determination module 102 is configured for, determining the first transmission configuration information including transmission configuration information shared by the first-type terminal and a second-type terminal, determining a second system message corresponding to the first-type terminal, and determining the second transmission configuration information based on the second system message.

Figure 13:
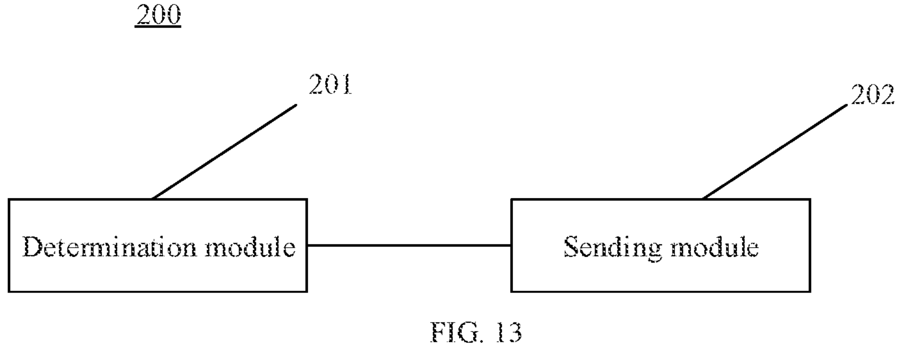
FIG. 13 is a block diagram of a message configuration apparatus shown according to an exemplary embodiment.

FIG. 13 is a block diagram of a message configuration apparatus shown according to an exemplary embodiment. Referring to FIG. 13, the message configuration apparatus 200 is applied to a first-type terminal, and includes a determination module 201 and a sending module 202.

The determination module 201 is configured for determining first transmission configuration information to be carried in a first system message; where the first transmission configuration information includes a portion of configuration information of an initial bandwidth part (BWP) of the first-type terminal. The sending module 202 is configured for sending the first system message. The first system message is configured for the first-type terminal to determine second transmission configuration information not carried in the first system message. The second transmission configuration information is a remaining portion of the configuration information of the initial BWP of the first-type terminal, other than the first transmission configuration information.

In the embodiments of the present disclosure, the configuration information of the BWP at least includes any one of:

frequency band information of a BWP; configuration information of one or more channels within a BWP; and subcarrier spacing information of a BWP.

In the embodiments of the present disclosure, the first transmission configuration information includes first frequency domain position configuration information.

In the embodiments of the present disclosure, the first transmission configuration information includes the frequency domain position of the uplink BWP and the difference between the frequency bands of the uplink BWP and the downlink BWP.

In the embodiments of the present disclosure, the first transmission configuration information includes the frequency domain position of the downlink BWP and the difference between the frequency bands of the uplink BWP and the downlink BWP.

In the embodiments of the present disclosure, the first transmission configuration information includes configuration information of an uplink BWP of a second-type terminal. A capability of the second-type terminal is greater than a capability of the first-type terminal.

In the embodiments of the present disclosure, the first transmission configuration information includes configuration information of a downlink BWP of a second-type terminal.

In the embodiments of the present disclosure, the first transmission configuration information includes transmission configuration information shared by the first-type terminal and a second-type terminal.

The specific manners in which each of the modules of the apparatus in the above embodiments performs operations have been described in detail in the embodiments related to the method, and will not be explained here in detail.

Figure 14:
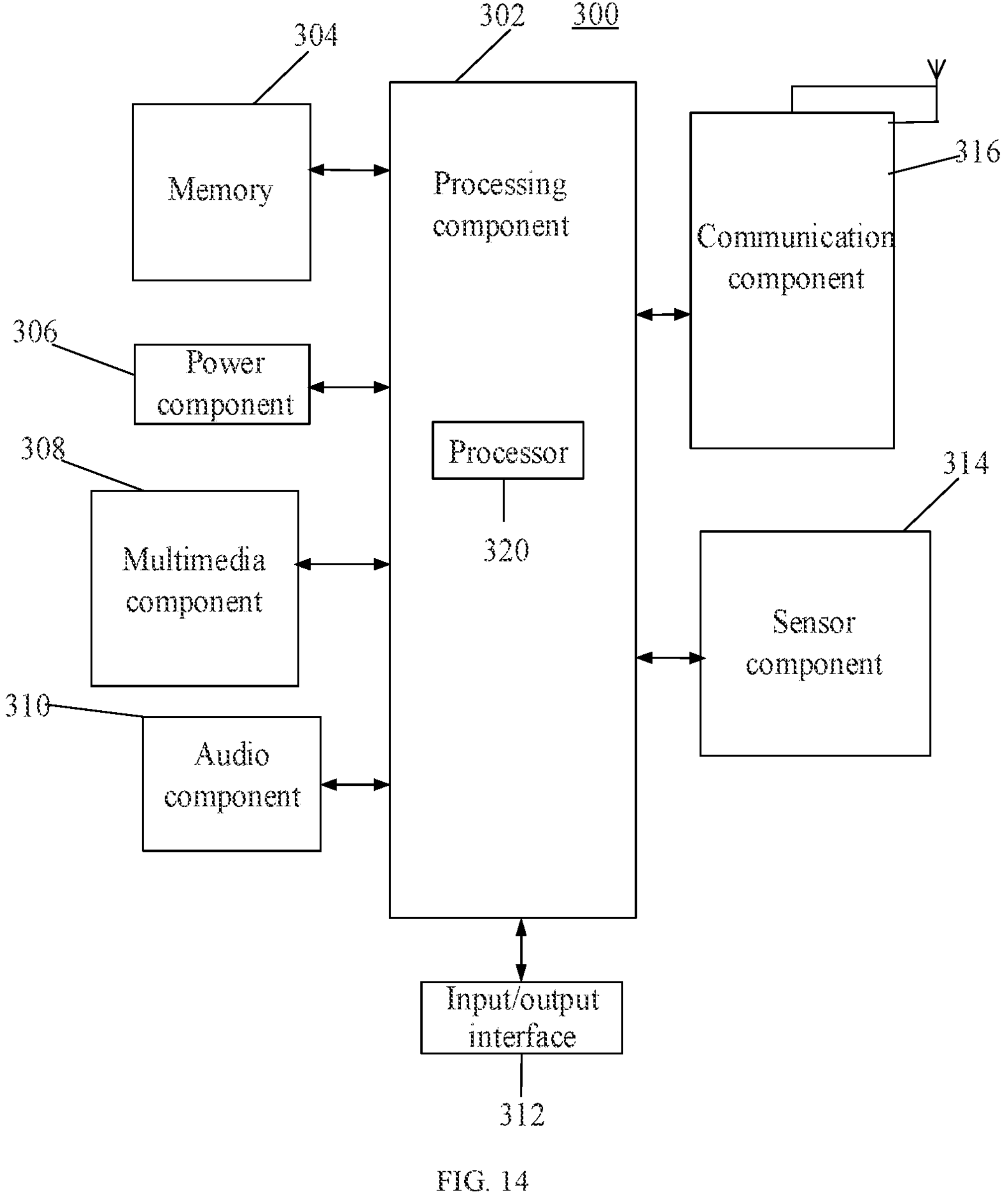
FIG. 14 is a block diagram of a message configuration apparatus shown according to an exemplary embodiment.

FIG. 14 is a block diagram of a message configuration apparatus 300 shown according to an exemplary embodiment. For example, the apparatus 300 may be a mobile phone, a computer, a digital broadcast terminal, a message transceiving device, a game console, a tablet device, a medical device, a fitness device, a personal digital assistant, etc.

Referring to FIG. 14, the apparatus 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operation of the apparatus 300, such as operations associated with display, phone calls, data communication, camera operations, and recording operations. The processing component 302 may include one or more processors 320 to execute instructions to complete all or part of the steps in the above methods. Additionally, the processing component 302 may include one or more modules to facilitate interaction between the processing component 302 and other components. For example, the processing component 302 may include a multimedia module to facilitate interaction between the multimedia component 308 and the processing component 302.

The memory 304 is configured for storing various types of data to support operations of the apparatus 300. Examples of such data include instructions, contact data, phonebook data, messages, pictures, videos, etc., for any application program or method operating on the apparatus 300. The memory 304 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 306 provides power to various components of the apparatus 300. The power component 306 may include a power supply management system, one or more power supplies, and other components that are associated with generating, managing, and distributing power for the apparatus 300.

The multimedia component 308 includes a screen providing an output interface between the apparatus 300 and the user. In some embodiments, the screen may include a liquid crystal display (LCD) and a touch panel (TP). If the screen includes the touch panel, the screen may be implemented as a touch screen, to receive an input signal from the user. The touch panel includes one or more touch sensors to sense the touch, the slide, and the gesture on the touch panel. The touch sensor may not only sense a boundary of the touch or slide action, but also detect a duration and pressure related to the touch or slide operation. In some embodiments, the multimedia component 308 includes a front facing camera and/or a rear facing camera. When the apparatus 300 is in an operation mode, such as a shooting mode or a video mode, the front facing camera and/or the rear facing camera may receive external multimedia data. Each front facing and rear facing camera may be a fixed optical lens system or have a focal length and an optical zoom capability.

The audio component 310 is configured for outputting and/or inputting audio signals. For example, the audio component 310 includes a microphone (MIC). The microphone is configured for receiving external audio signals when the apparatus 300 is in the operating mode, such as a call mode, a recording mode, and a speech recognition mode. The received audio signals may be further stored in the memory 304 or sent via the communication component 316. In some embodiments, the audio component 310 also includes a speaker for outputting the audio signals.

The I/O interface 312 provides an interface between the processing component 302 and peripheral interface modules. The above peripheral interface modules may be keyboards, click wheels, buttons, etc. These buttons may include but are not limited to: a home button, a volume button, a start button, and a lock button.

The sensor component 314 includes one or more sensors to provide various aspects of state assessment for the apparatus 300. For example, the sensor component 314 may detect an open/closed state of the apparatus 300, relative positioning of components that are for example a display and keypad of the apparatus 300. The sensor component 314 may also detect a position change of the apparatus 300 or of a component of the apparatus 300, presence or absence of the user contacting with the apparatus 300, an orientation or acceleration/deceleration of the apparatus 300, and a temperature change of the apparatus 300. The sensor component 314 may include a proximity sensor configured for detecting the presence of nearby objects without any physical contact. The sensor component 314 may also include a light sensor, such as a CMOS or CCD image sensor, for use in an imaging application. In some embodiments, the sensor component 314 may also include an acceleration sensor, a gyroscope sensor, a magnetic sensor, a pressure sensor, or a temperature sensor.

The communication component 316 is configured for facilitating wired or wireless communication between the apparatus 300 and other devices. The apparatus 300 may access a wireless network based on a communication standard, such as WiFi, 2G, 3G, or a combination of them. In an exemplary embodiment, the communication component 316 receives, via a broadcast channel, a broadcast signal or broadcast related information from an external broadcast management system. In an exemplary embodiment, the communication component 316 further includes a near-field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to perform the above methods.

In an exemplary embodiment, a non-transitory computer-readable storage medium including instructions is also provided, such as the memory 304 including the instructions. The above instructions may be executed by the processor 320 of the apparatus 300 to complete the above methods. For example, the non-transitory computer-readable storage medium may be a ROM, a random access memory (RAM), a CD-ROM, a magnetic tape, a floppy disk, an optical data storage device, etc.

Figure 15:
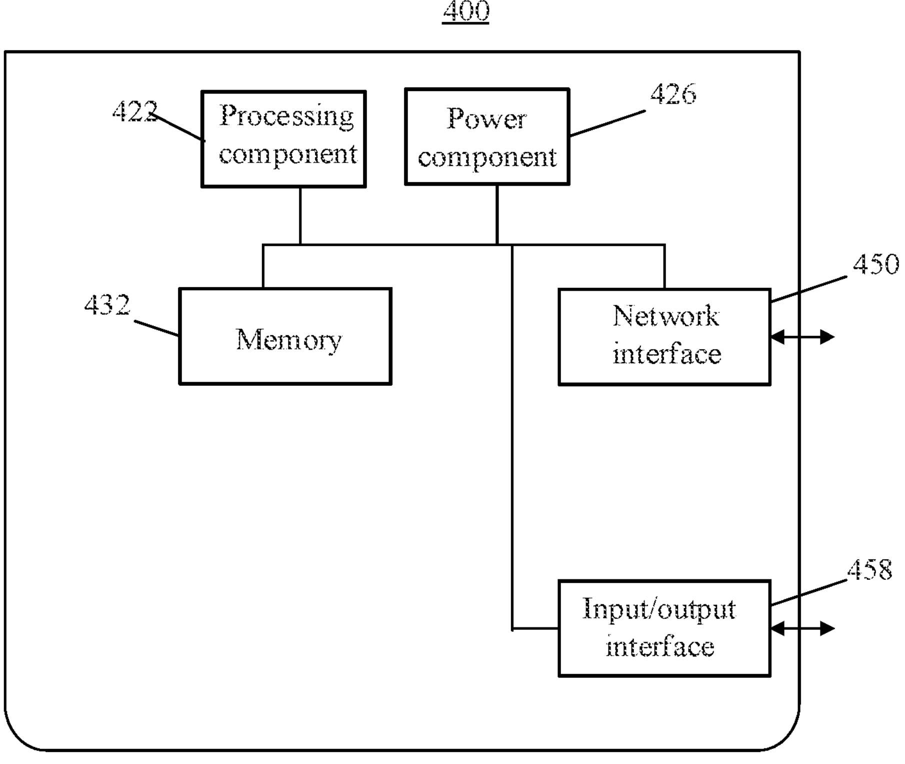
FIG. 15 is a block diagram of a message configuration apparatus shown according to an exemplary embodiment.

FIG. 15 is a block diagram of a message configuration apparatus 400 shown according to an exemplary embodiment. For example, the apparatus 400 may be provided as a server. Referring to FIG. 15, the apparatus 400 includes a processing component 422 that further includes one or more processors, and memory resources represented by a memory 432, for storing instructions that is executable by the processing component 422, such as an application program. The application program stored in the memory 432 may include one or more modules that each corresponds to a set of instructions. In addition, the processing component 422 is configured for executing the instructions to perform the above methods.

The apparatus 400 may also include a power component 426 configured for perform power management of the apparatus 400, a wired or wireless network interface 450 configured for connecting the apparatus 400 to the network, and an input/output (I/O) interface 458. The apparatus 400 may operate an operating system stored in the memory 432, such as Windows Server™, Mac OS X™, Unix™, Linux™, FreeBSD™, or a similar operating system.

It may be further understood that in the present disclosure, "multiple" refers to two or more, other quantifiers are similar thereto. "And/or" describes an association relationship of association objects, and represents that there may be three relationships. For example A and/or B may represent, existence of A alone, existence of both A and B, and existence of B alone. The character "/" generally indicates that a relationship between the context association objects is an "or" relationship. The singular forms of "a/an," "said," and "the" are also intended to include the plural form, unless the context clearly indicates other meanings.

It can be further understood that the terms "first," "second," etc., are used to describe various information, but such information should not be limited to these terms. These terms are only used to distinguish the same type of information from each other and do not indicate a specific order or importance. In fact, expressions such as "first" and "second" may be used interchangeably. For example, without departing from the scope of the present disclosure, first information may also be referred to as second information, and similarly, the second information may also be referred to as the first information.

It can be further understood that in the embodiments of the present disclosure, although the operations are described in a specific order in the accompanying drawings, it should not be understood as requiring to perform these operations in the specific order or serial order as shown, or requiring to perform all shown operations to obtain the desired result. In specific environments, multitasking and parallel processing may be advantageous.

Those skilled in the art will easily come up with other implementation solutions of the present disclosure after considering the specification and practicing the invention disclosed herein. The present disclosure aims to cover any variations, uses, or adaptive changes of the present disclosure, which follow general principles of the present disclosure and include common knowledge or customary technical means in the art not disclosed in the present disclosure. The specification and embodiments are only considered exemplary, and the true scope and spirit of the present disclosure are indicated by the following claims.

It should be understood that the present disclosure is not limited to the precise structure described above and shown in the drawings, and various modifications and changes may be made without departing from its scope. The scope of the present disclosure is limited only by the scope of the attached claims.

According to a first aspect of embodiments of the present disclosure, a message configuration method is provided. The message configuration method is performed by a first-type terminal, and includes: receiving a first system message, where the first system message is configured for carrying first transmission configuration information, and the first transmission configuration information includes a portion of configuration information of an initial bandwidth part (BWP) of the first-type terminal; and determining second transmission configuration information not carried in the first system message based on the first system message; where the second transmission configuration information is a remaining portion of the configuration information of the initial bandwidth part (BWP) of the first-type terminal, other than the first transmission configuration information.

In some examples in first aspect of the embodiments of the present disclosure, the configuration information of the BWP at least includes any one of: frequency band information of a BWP, configuration information of one or more channels within a BWP, and subcarrier spacing information of a BWP.

In some examples in first aspect of the embodiments of the present disclosure, determining the second transmission configuration information not carried in the first system message, includes: determining the second transmission configuration information not carried in the first system message based on the first transmission configuration information.

In some examples in first aspect of the embodiments of the present disclosure, determining the second transmission configuration information not carried in the first system message, includes: determining the first transmission configuration information including frequency domain position configuration information of a downlink BWP, and determining the frequency domain position configuration information of the downlink BWP as frequency domain position configuration information of a physical resource CORESET; where the frequency domain position configuration information of the CORESET is the second transmission configuration information; or determining the first transmission configuration information including the frequency domain position configuration information of the CORESET, and determining the frequency domain position configuration information of the CORESET as the frequency domain position configuration information of the downlink BWP; where the frequency domain position configuration information of the downlink BWP is the second transmission configuration information.

In some examples in first aspect of the embodiments of the present disclosure, determining the second transmission configuration information not carried in the first system message based on the first transmission configuration information, includes: determining the first transmission configuration information including a frequency domain position of an initial uplink BWP and a difference between frequency bands of the initial uplink BWP and an initial downlink BWP, and determining a frequency domain position of the initial downlink BWP according to the frequency domain position of the initial uplink BWP and the difference between the frequency bands; where, the frequency domain position of the initial downlink BWP is the second transmission configuration information.

In some examples in first aspect of the embodiments of the present disclosure, determining the second transmission configuration information not carried in the first system message based on the first transmission configuration information, includes: determining the first transmission configuration information including a frequency domain position of an initial downlink BWP and a difference between frequency bands of an initial uplink BWP and the initial downlink BWP, and determining a frequency domain position of the initial uplink BWP according to the frequency domain position of the initial downlink BWP and the difference between the frequency bands; where, the frequency domain position of the initial uplink BWP is the second transmission configuration information.

In some examples in first aspect of the embodiments of the present disclosure, determining the second transmission configuration information not carried in the first system message based on the first transmission configuration information, includes: determining the first transmission configuration information including a portion of configuration information of an uplink BWP of a second-type terminal, and determining the portion of the configuration information of the uplink BWP of the second-type terminal as the second transmission configuration information; where a capability of the second-type terminal is greater than a capability of the first-type terminal.

In some examples in first aspect of the embodiments of the present disclosure, determining the second transmission configuration information not carried in the first system message based on the first transmission configuration information, includes: determining the first transmission configuration information including a portion of configuration information of a downlink BWP of a second-type terminal, and determining the portion of the configuration information of the downlink BWP of the second-type terminal as the second transmission configuration information; where a capability of the second-type terminal is greater than a capability of the first-type terminal.

In some examples in first aspect of the embodiments of the present disclosure, determining the second transmission configuration information not carried in the first system message based on the first transmission configuration information, includes: determining the first transmission configuration information including transmission configuration information shared by the first-type terminal and a second-type terminal, determining a second system message corresponding to the first-type terminal, and determining the second transmission configuration information based on the second system message.

According to a second aspect of embodiments of the present disclosure, a message configuration method is provided. The message configuration method is performed by a network device, and includes: determining first transmission configuration information to be carried in a first system message; where the first transmission configuration information includes a portion of configuration information of an initial bandwidth part (BWP) of the first-type terminal; and sending the first system message; where the first system message is configured for the first-type terminal to determine second transmission configuration information not carried in the first system message; where the second transmission configuration information is a remaining portion of the configuration information of the initial bandwidth part (BWP) of the first-type terminal, other than the first transmission configuration information.

In some examples in the second aspect of the embodiments of the present disclosure, the configuration information of the BWP at least includes any one of: frequency band information of a BWP, configuration information of one or more channels within a BWP, and subcarrier spacing information of a BWP.

In some examples in the second aspect of the embodiments of the present disclosure, the first transmission configuration information includes first frequency domain position configuration information.

In some examples in the second aspect of the embodiments of the present disclosure, the first transmission configuration information includes the frequency domain position of the uplink BWP and the difference between the frequency bands of the uplink BWP and the downlink BWP.

In some examples in the second aspect of the embodiments of the present disclosure, the first transmission configuration information includes the frequency domain position of the downlink BWP and the difference between the frequency bands of the uplink BWP and the downlink BWP.

In some examples in the second aspect of the embodiments of the present disclosure, the first transmission configuration information includes configuration information of an uplink BWP of a second-type terminal; where a capability of the second-type terminal is greater than a capability of the first-type terminal.

In some examples in the second aspect of the embodiments of the present disclosure, the first transmission configuration information includes configuration information of a downlink BWP of a second-type terminal.

In some examples in the second aspect of the embodiments of the present disclosure, the first transmission configuration information includes transmission configuration information shared by the first-type terminal and a second-type terminal.

According to a third aspect of embodiments of the present disclosure, a message configuration apparatus is provided. The message configuration apparatus is applied to a first-type terminal, and includes: a receiving module, configured for receiving a first system message, where the first system message is configured for carrying first transmission configuration information, and the first transmission configuration information includes a portion of configuration information of an initial bandwidth part (BWP) of the first-type terminal; and a determination module, configured for determining second transmission configuration information not carried in the first system message based on the first system message; where the second transmission configuration information is BWP configuration information of the initial bandwidth part (BWP) of the first-type terminal, other than the first transmission configuration information.

In some examples in the third aspect of the embodiments of the present disclosure, the configuration information of the BWP at least includes any one of; frequency band information of a BWP, configuration information of one or more channels within a BWP, and subcarrier spacing information of a BWP.

In some examples in the third aspect of the embodiments of the present disclosure, the determination module is configured for: determining the second transmission configuration information not carried in the first system message based on the first transmission configuration information.

In some examples in the third aspect of the embodiments of the present disclosure, the determination module is configured for: determining the first transmission configuration information including frequency domain position configuration information of a downlink BWP, and determining the frequency domain position configuration information of the downlink BWP as frequency domain position configuration information of a physical resource CORESET; where the frequency domain position configuration information of the CORESET is the second transmission configuration information; or determining the first transmission configuration information including the frequency domain position configuration information of the CORESET, and determining the frequency domain position configuration information of the CORESET as the frequency domain position configuration information of the downlink BWP; where the frequency domain position configuration information of the downlink BWP is the second transmission configuration information.

In some examples in the third aspect of the embodiments of the present disclosure, the determination module is configured for: determining the first transmission configuration information including a frequency domain position of an initial uplink BWP and a difference between frequency bands of the initial uplink BWP and an initial downlink BWP, and determining a frequency domain position of the initial downlink BWP according to the frequency domain position of the initial uplink BWP and the difference between the frequency bands; where, the frequency domain position of the initial downlink BWP is the second transmission configuration information.

In some examples in the third aspect of the embodiments of the present disclosure, the determination module is configured for: determining the first transmission configuration information including a frequency domain position of an initial downlink BWP and a difference between frequency bands of an initial uplink BWP and the initial downlink BWP, and determining a frequency domain position of the initial uplink BWP according to the frequency domain position of the initial downlink BWP and the difference between the frequency bands; where, the frequency domain position of the initial uplink BWP is the second transmission configuration information.

In some examples in the third aspect of the embodiments of the present disclosure, the determination module is configured for: determining the first transmission configuration information including a portion of configuration information of an uplink BWP of a second-type terminal, and determining the portion of the configuration information of the uplink BWP of the second-type terminal as the second transmission configuration information; where a capability of the second-type terminal is greater than a capability of the first-type terminal.

In some examples in the third aspect of the embodiments of the present disclosure, the determination module is configured for: determining the first transmission configuration information including a portion of configuration information of a downlink BWP of a second-type terminal, and determining the portion of the configuration information of the downlink BWP of the second-type terminal as the second transmission configuration information; where a capability of the second-type terminal is greater than a capability of the first-type terminal.

In some examples in the third aspect of the embodiments of the present disclosure, the determination module is configured for: determining the first transmission configuration information including transmission configuration information shared by the first-type terminal and a second-type terminal, determining a second system message corresponding to the first-type terminal, and determining the second transmission configuration information based on the second system message.

According to a fourth aspect of embodiments of the present disclosure, a message configuration apparatus is provided. The message configuration apparatus is applied to a network device, and includes: a determination module, configured for determining first transmission configuration information to be carried in a first system message; where the first transmission configuration information includes a portion of configuration information of an initial bandwidth part (BWP) of the first-type terminal; and a sending module, configured for sending the first system message; where the first system message is configured for the first-type terminal to determine second transmission configuration information not carried in the first system message; where the second transmission configuration information is configuration information of the initial bandwidth part (BWP) of the first-type terminal, other than the first transmission configuration information.

In some examples in the fourth aspect of the embodiments of the present disclosure, the configuration information of the BWP at least includes any one of: frequency band information of a BWP, configuration information of one or more channels within a BWP, and subcarrier spacing information of a BWP.

In some examples in the fourth aspect of the embodiments of the present disclosure, the first transmission configuration information includes first frequency domain position configuration information.

In some examples in the fourth aspect of the embodiments of the present disclosure, the first transmission configuration information includes the frequency domain position of the uplink BWP and the difference between the frequency bands of the uplink BWP and the downlink BWP.

In some examples in the fourth aspect of the embodiments of the present disclosure, the first transmission configuration information includes the frequency domain position of the downlink BWP and the difference between the frequency bands of the uplink BWP and the downlink BWP.

In some examples in the fourth aspect of the embodiments of the present disclosure, the first transmission configuration information includes configuration information of an uplink BWP of a second-type terminal; where a capability of the second-type terminal is greater than a capability of the first-type terminal.

In some examples in the fourth aspect of the embodiments of the present disclosure, the first transmission configuration information includes configuration information of a downlink BWP of a second-type terminal.

In some examples in the fourth aspect of the embodiments of the present disclosure, the first transmission configuration information includes transmission configuration information shared by the first-type terminal and a second-type terminal.

According to a fifth aspect of embodiments of the present disclosure, a message configuration apparatus is provided. The message configuration apparatus includes: a processor and a memory storing instructions executable by the processor; where, the processor is configured for: performing the message configuration method described in the first aspect or any one of the implementations of the first aspect, or performing the message configuration method described in the second aspect or any one of the implementations of the second aspect.

According to a sixth aspect of embodiments of the present disclosure, a non-transitory computer-readable storage medium is provided. Instructions in the storage medium, when executed by a processor of a mobile terminal, cause the mobile terminal to perform the message configuration method described in the first aspect or any one of the implementations of the first aspect, or cause the mobile terminal to perform the message configuration method described in the second aspect or any one of the implementations of the second aspect.

The invention claimed is:

1. A message configuration method, performed by a reduced capability user equipment (Redcap UE), and comprising:

receiving a first system message, wherein the first system message is configured for carrying first transmission configuration information, and the first transmission configuration information comprises configuration information of an initial bandwidth part (BWP) for the Redcap UE; and determining second transmission configuration information not carried in the first system message based on configuration information of a synchronization signal block (SSB) carried in the first system message;

wherein the second transmission configuration information is BWP configuration information for the Redcap UE, other than the first transmission configuration information.

2. The message configuration method of claim 1, wherein the configuration information of the BWP at least comprises any one of:

frequency band information of a BWP;

configuration information of one or more channels within a BWP; and subcarrier spacing information of a BWP.

3. The message configuration method of claim 1, wherein determining the second transmission configuration information not carried in the first system message, comprises:

determining the second transmission configuration information not carried in the first system message based on the first transmission configuration information.

4. The message configuration method of claim 3, wherein determining the second transmission configuration information not carried in the first system message based on the first transmission configuration information, comprises one of:

determining the first transmission configuration information comprising frequency domain position configuration information of a downlink BWP, and determining the frequency domain position configuration information of the downlink BWP as frequency domain position configuration information of a physical resource control resource set (CORESET); wherein the frequency domain position configuration information of the CORESET is the second transmission configuration information; or determining the first transmission configuration information comprising the frequency domain position configuration information of the CORESET, and determining the frequency domain position configuration information of the CORESET as the frequency domain position configuration information of the downlink BWP; wherein the frequency domain position configuration information of the downlink BWP is the second transmission configuration information.

5. The message configuration method of claim 3, wherein determining the second transmission configuration information not carried in the first system message based on the first transmission configuration information, comprises:

determining the first transmission configuration information comprising a frequency domain position of an initial uplink BWP and a difference between frequency bands of the initial uplink BWP and an initial downlink BWP, and determining a frequency domain position of the initial downlink BWP according to the frequency domain position of the initial uplink BWP and the difference between the frequency bands;

wherein the frequency domain position of the initial downlink BWP is the second transmission configuration information.

6. The message configuration method of claim 3, wherein determining the second transmission configuration information not carried in the first system message based on the first transmission configuration information, comprises:

determining the first transmission configuration information comprising a frequency domain position of an initial downlink BWP and a difference between frequency bands of an initial uplink BWP and the initial downlink BWP, and determining a frequency domain position of the initial uplink BWP according to the frequency domain position of the initial downlink BWP and the difference between the frequency bands;

wherein the frequency domain position of the initial uplink BWP is the second transmission configuration information.

7. The message configuration method of claim 3, wherein determining the second transmission configuration information not carried in the first system message based on the first transmission configuration information, comprises:

determining the first transmission configuration information comprising a portion of configuration information of an uplink BWP of a non-Redcap UE, and determining the portion of the configuration information of the uplink BWP of the non-Redcap UE as the second transmission configuration information;

wherein a capability of the non-Redcap UE is greater than a capability of the Redcap UE.

8. The message configuration method of claim 3, wherein determining the second transmission configuration information not carried in the first system message based on the first transmission configuration information, comprises:

determining the first transmission configuration information comprising a portion of configuration information of a downlink BWP of a non-Redcap UE, and determining the portion of the configuration information of the downlink BWP of the non-Redcap UE as the second transmission configuration information;

wherein a capability of the non-Redcap UE is greater than a capability of the Redcap UE.

9. The message configuration method of claim 3, wherein determining the second transmission configuration information not carried in the first system message based on the first transmission configuration information, comprises:

determining the first transmission configuration information comprising transmission configuration information shared by the Redcap UE and a non-Redcap UE, and determining a second system message corresponding to the Redcap UE; and determining the second transmission configuration information based on the second system message.

10. A message configuration method, performed by a network device and comprising:

determining first transmission configuration information to be carried in a first system message, wherein the first transmission configuration information comprises configuration information of an initial bandwidth part (BWP) for a reduced capability user equipment (Redcap UE); and sending the first system message, wherein configuration information of a synchronization signal block (SSB) carried in the first system message is configured for the Redcap UE to determine second transmission configuration information not carried in the first system message;

wherein the second transmission configuration information is BWP configuration information for the Redcap UE, other than the first transmission configuration information.

11. The message configuration method of claim 10, wherein the configuration information of the BWP at least comprises any one of:

frequency band information of a BWP;

configuration information of one or more channels within a BWP; and subcarrier spacing information of a BWP.

12. The message configuration method of claim 10, wherein the first transmission configuration information comprises frequency domain position configuration information of a downlink BWP or frequency domain position configuration information of a control resource set (CORESET).

13. The message configuration method of claim 10, wherein the first transmission configuration information comprises frequency domain position configuration information of an uplink BWP and a difference between frequency bands of the uplink BWP and a downlink BWP.

14. The message configuration method of claim 10, wherein the first transmission configuration information comprises frequency domain position configuration information of a downlink BWP and a difference between frequency bands of an uplink BWP and the downlink BWP.

15. The message configuration method of claim 10, wherein the first transmission configuration information comprises configuration information of an uplink BWP of a non-Redcap UE;

wherein a capability of the non-Redcap UE is greater than a capability of the Redcap UE.

16. The message configuration method of claim 10, wherein the first transmission configuration information comprises configuration information of a downlink BWP of a non-Redcap UE;

wherein a capability of the non-Redcap UE is greater than a capability of the Redcap UE.

17. The message configuration method of claim 10, wherein the first transmission configuration information comprises transmission configuration information shared by the Redcap UE and a non-Redcap UE.

18. A message configuration apparatus, comprising:

a processor; and a memory storing instructions executable by the processor;

wherein the processor is configured to:

receive a first system message, wherein the first system message is configured for carrying first transmission configuration information, and the first transmission configuration information comprises configuration information of an initial bandwidth part (BWP) for a reduced capability user equipment (Redcap UE); and determine second transmission configuration information not carried in the first system message based on configuration information of a synchronization signal block (SSB) carried in the first system message;

wherein the second transmission configuration information is BWP configuration information for the Redcap UE, other than the first transmission configuration information.

19. A non-transitory computer-readable storage medium, wherein having stored therein instructions that, when executed by a processor of a mobile terminal, cause the mobile terminal to perform the message configuration method of claim 1.

20. A message configuration apparatus, comprising:

a processor; and a memory storing instructions executable by the processor;

wherein the processor is configured to perform the message configuration method of claim 10.

* * * * *